United States Patent [19]

Latshaw

[11] Patent Number: 5,071,390
[45] Date of Patent: Dec. 10, 1991

[54] SHAFT WITH FLUID TRANSFER STRUCTURE

[75] Inventor: Harry E. Latshaw, Danville, Ind.

[73] Assignee: General Motors Corporation, Detroit, Mich.

[21] Appl. No.: 580,062

[22] Filed: Sep. 10, 1990

[51] Int. Cl.⁵ .............................................. F16C 1/24
[52] U.S. Cl. ...................................... 464/7; 464/183; 184/6.11
[58] Field of Search .................... 464/7, 179, 183, 185, 464/16, 17; 184/6.11

[56] References Cited

U.S. PATENT DOCUMENTS

| | | | |
|---|---|---|---|
| 1,664,713 | 4/1928 | Strickland | 464/183 X |
| 2,457,999 | 1/1949 | Hulbert | 184/6.11 |
| 3,285,566 | 11/1966 | Schmitz et al. | 184/6.11 X |
| 3,411,321 | 11/1968 | Schurman | 464/183 |
| 3,963,228 | 6/1976 | Karle | 464/7 X |

Primary Examiner—Daniel P. Stodola
Assistant Examiner—Tony A. Gayoso
Attorney, Agent, or Firm—Donald F. Scherer

[57] ABSTRACT

A fluid transfer structure for a transmission has a tube disposed in a central bore of a shaft. The shaft and the tube cooperate to provide a feed passage, central of the tube, and a substantially annular lube passage formed between the tube and the central bore. The tube and shaft have cooperating structures that provide proper alignment of the tube in the central bore. A plurality of radial passages are formed in the shaft in communication with the central bore. At least one of the radial passages is in communication with the feed passage which is sealed from fluid communication with the annular lube passage. The remaining radial passages are in limited fluid communication with the annular lube passage. The tube has radially outwardly extending portions aligned with respective ones of the radial passages and cooperate therewith to form flow restriction structures. The extending portions are not fully annular such that free fluid flow is possible along the length of the annular passage.

2 Claims, 2 Drawing Sheets 5,071,390

SHAFT WITH FLUID TRANSFER STRUCTURE

BACKGROUND OF THE INVENTION

This invention relates to fluid transfer structures, and more particularly, to such structures incorporated in a rotary shaft member in a power transmission for providing plural parallel flow paths for lubrication and clutch pressure feed.

Prior art devices have used tubes inserted within a central bore of a shaft to provide a lube or cooling circuit and a parallel pressure feed circuit which are sealed from each other. These devices supply fluid to radial passages spaced along the shaft but do not generally control the amount of fluid distribution to any individual radial passage. The fluid admitted to a particular radial lube passage has been controlled by an orifice formed in each of the radial passages. This, of course, requires accurate machining and generally the use of a stepped drilling operation or two distinct drilling operations. If the orifices are of different sizes, additional machining complexity is encountered.

Other prior art systems simply provide sufficient lube fluid flow to maintain lubrication. These systems must provide more fluid than necessary to ensure proper lubrication and can suffer from reduced lubrication when other system demands are high. The fluid pump requirements are therefore increased resulting in increased energy consumption and reduced efficiency.

SUMMARY OF THE INVENTION

The present invention provides improved lubrication flow to individual circuits while improving system efficiency and reducing manufacturing cost. A tube is fitted to a central passage or bore in a transmission shaft to establish a clutch feed passage or circuit through the center of the tube and an annular lube circuit or passage between the tube and the surface of the central bore. The tube is provided with protuberances spaced along the outer periphery thereof which cooperate with respective radial lube passages to form individual flow restrictions at each radial passage. The protuberances do not encompass a full annulus and therefore permit free fluid flow along the outer surface of the tube thereby ensuring sufficient fluid is delivered to each radial lube passage.

The tubes are molded of either plastic or metal, and the protuberances are formed during the molding process. An alignment structure is also formed on the tubes during the molding process. A cooperating structure is formed on the shaft during forming or machining thereof; and can be as simple as a drilled hole or a slot formed in the shaft end.

It is therefore an object of this invention to provide an improved fluid transfer structure in a rotary shaft, including a tube secured in a central bore in the shaft, wherein two parallel fluid circuits are presented and wherein one of the circuits provides individually restricted fluid flow to a plurality of radial passages formed in the shaft.

It is another object of this invention to provide an improved fluid transfer structure in a rotary shaft, including a tube secured in a central bore in the shaft and cooperating therewith to form two fluid circuits, one of which is a lubrication circuit including a substantially annular passage formed between the surface of the bore and the outer surface of the tube, and the other of which is a high pressure clutch feed circuit disposed centrally of the tube, and the first of the circuits provides individually restricted fluid flow to a plurality of radial lube passages formed in the shaft, and also wherein communication between the two circuits is prevented by seal members.

It is a further object of this invention to provide an improved fluid transfer structure in a rotary shaft, including a tube secured in a central bore in the shaft, wherein two fluid circuits are presented, one of which includes an annular passage cooperating with protuberances on the outer surface of the tube to provide individually restricted fluid flow to a plurality of radial lube passages formed in the shaft; and further wherein the tube and shaft have cooperating alignment structure to ensure that the protuberances are aligned with the radial lube passages.

It is yet another object of this invention to provide an improved fluid transfer structure in a rotary shaft including a tube secured in a central bore in the shaft from which is presented a plurality of protuberances radially aligned and cooperating with radial lube passages in the shaft to provide individually restricted fluid flow to the radial lube passages, and wherein the tube and shaft have formed thereon cooperating alignment devices to ensure proper alignment between the protuberances and the respective radial lube passages.

These and other objects and advantages will be more apparent from the following description and drawings.

DESCRIPTION OF THE EMBODIMENTS

Figure 1:
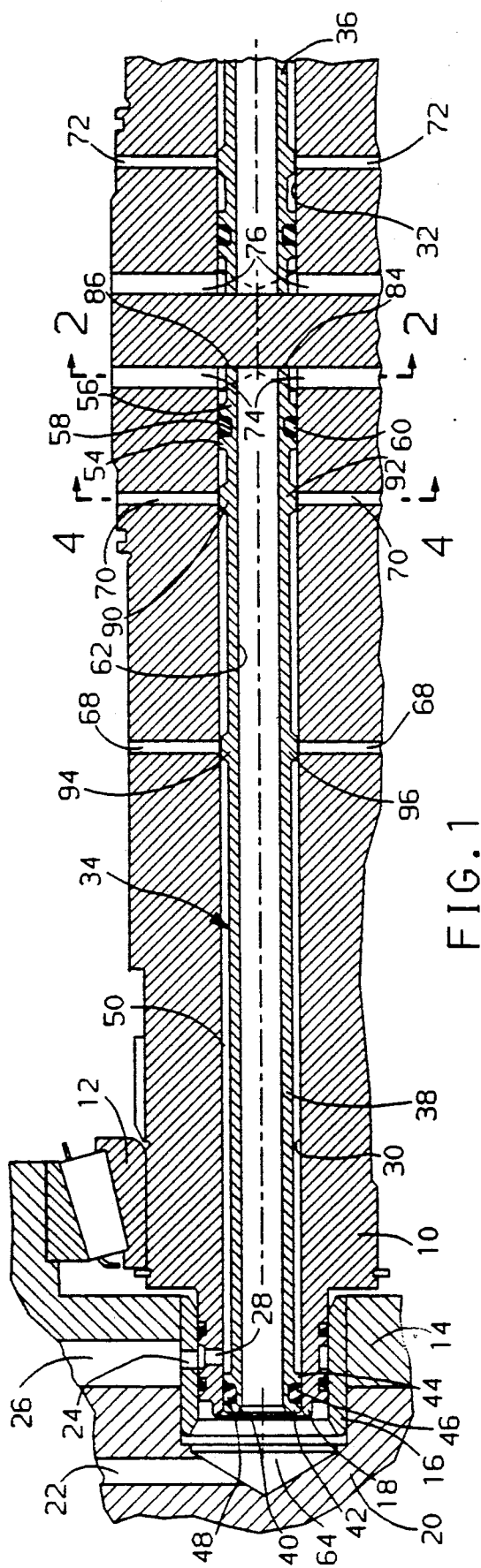
FIG. 1 is a sectional view of a shaft incorporating one embodiment of the present invention.

Referring to the drawings, wherein like characters represent the same or corresponding parts throughout the several views, there is seen in FIG. 1 a transmission shaft 10 rotatably supported in a bearing 12 which is secured in a support plate 14. The other end of shaft 10, not shown, is similarly supported. The support plate 14 has disposed therein a bushing 16 in which an end 18 of the shaft 10 is rotatably disposed. The bushing 16 is also secured in an end cover 20 which has formed therein a feed passage 22. The bushing 16 has formed therein a lube passage 24 which is in fluid communication between a lube passage 26 formed in the support plate 14 and a lube passage 28 formed in the shaft 10.

The shaft 10 is preferably a component in a power transmission wherein one or more countershafts are utilized, such as that shown in U.S. Ser. No. 07/502,194, filed March 30, 1990, in the name of Ordo et al., and assigned to the assignee of the present invention. The shaft 10 has a pair of central bores 30 and 32. The central bore 30 is open at the end 18 and the central bore 32 is open at the opposite end of shaft 10. The central bore 30 has disposed therein a fluid transfer tube 34, and an identical transfer tube 36 is disposed in the central bore 32. The following description of tube 34 will serve as a description for the tube 36 also since, in this embodiment, they are substantially identical.

The tube 34 has an elongated annular body 38. The left end 40 of the elongated body 38 has a pair of annular walls 42 and 44 between which is formed a seal groove 46 in which is disposed an annular type sealing ring 48. The elongated body 38 cooperates with the central bore 30 and the annular wall 44 to form an annular passage 50. The right end 52 of the tube 34 has formed adjacent thereto a pair of annular walls 54 and 56 which are spaced to form a seal groove 58 in which is disposed a seal member 60. The seal member 60 is effective to close the right end of the annular passage 50.

The tube 34 has formed therein a central passage 62 which provides fluid communication between a feed chamber 64 at the left end of the shaft 10 and the right end 52 of the tube 34. The chamber 64 is in fluid communication with the passage 22 which may be selectively pressurized in a conventional manner to supply high pressure fluid to the central passage 62.

Figure 3:
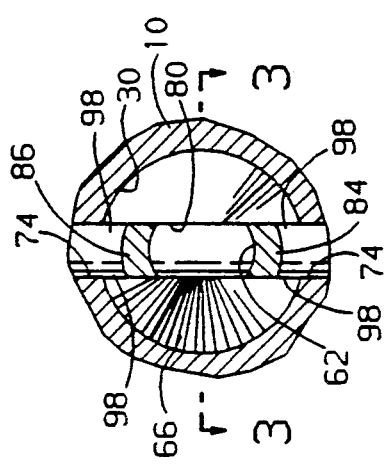
FIG. 3 is a view taken along line 3—3 in FIG. 2.

The central bore 30 is formed by a drilling operation which, as seen in FIG. 3, provides a pointed or conical surface 66. The shaft 10 is cross-drilled with a plurality of radial lube passages 68, 70 and 72, and a pair of radial feed passages 74 and 76. The radial lube passages 68 and 70, and the radial feed passage 74 are disposed for fluid communication of the central bore 30 prior to the insertion of the tube 34.

The radial feed passage 74, as seen in FIG. 3, intersects the apex 78 of the cone 66 to provide a cylindrical locating wall or slot 80. The end 52 of tube 34 has formed thereon a pair of locating tabs or positioning extensions 84 and 86 which have substantially cylindrical ends 88. The cylindrical ends 88 are alignable with the locating wall 80 to provide correct positioning of the tube 34 within the central bore 30.

Figure 4:
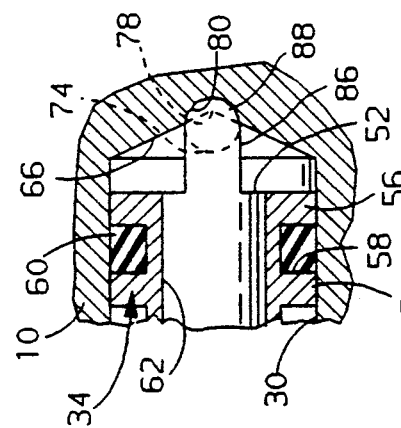
FIG. 4 is a view taken along line 4—4 in FIG. 1.

The tube 34 has formed on the outer surface of the elongated body portion 38 a plurality of radially extending protuberances 90, 92, 94 and 96. As best seen in FIG. 4, the protuberances 90 and 92 are diametrically opposed and have a circumferential extent less than the full circumference of the elongated body portion 38. It is apparent from FIGS. 1 and 4 that the radial protuberances 90 and 92 are aligned with the radial feed passages 70. The radial protuberances 94 and 96 are, in a similar manner, aligned with the radial lube passages 68. The protuberances 90-96 cooperate with the central bore 30 to provide fluid restrictions between the annular passage 50 and the respective radial lube passages 70 and 68.

The fact that the protuberances are not annular provides a free flowing fluid passage along the annular passage 50 in bypassing relationship with the fluid restrictions. The restrictive value of the protuberances is determined by the annular extent of each protuberance, the width of each protuberance and the distance between the outer surface of the protuberances and the inner surface of the central bore 30.

Since the tube 34 can be manufactured utilizing injection molding techniques, the dimensions of the various parts of the tube 34 can be maintained to close tolerances thereby establishing accurate fluid restrictions for each of the radial lube passages. The radial lube passage 68 can be utilized to provide lubrication fluid to a gear or bushing member rotatably mounted on the outer surface of shaft 10, while the radial lube passage 70 can be disposed for fluid communication with a rotating clutch member which might be secured to the outer surface of shaft 10. Examples of these structures can be seen in the above-mentioned U.S. Ser. No. 07/502,195.

The fluid restrictions provided by the protuberances 90-96 permit a very accurate control of the volume of fluid which is distributed through the respective radial lube passages. Knowing the distribution potential of each lube passage, it is a simple matter to determine how much pump volume will be required to provide the desired lubrication. Since excess flow will not be necessary, this will permit designing the size of the pump to a minimum value.

Figure 2:
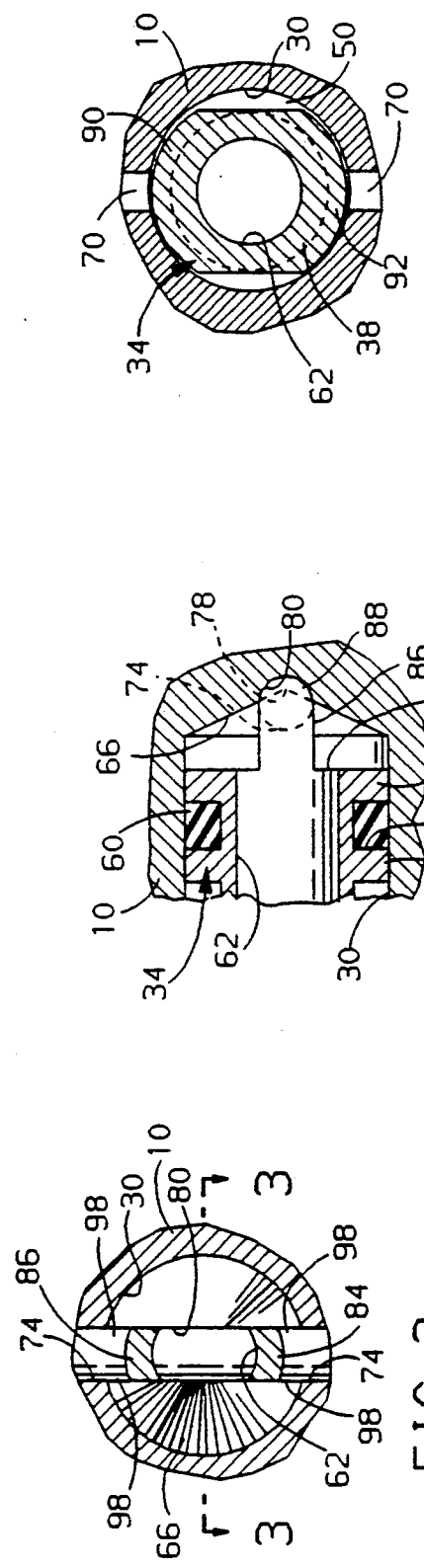
FIG. 2 is a view taken along line 2—2 in FIG. 1.

As seen in FIG. 2, the locating extensions 84 and 86 cooperate with the central passage 62 and the central bore 30 to provide a plurality of fluid openings 98 between the central passage 62 and the radial feed passages 74. Thus, when the feed passage 22 is pressurized, the fluid pressure will pass through the central passage 62 to the radial feed passages 74. The seal members 48 and 60 prevent the fluid pressure from communicating with the annular passage 50. The radial feed passages 74 are preferably connected with conventional clutch assemblies having an apply chamber and a power piston. Such assemblies are well known and examples of these members can be seen in the above-mentioned U.S. Ser. No. 07/502,195.

The cooperation between the locating wall 80 and the locating extensions 84 and 86 ensures that the proper alignment between the protuberances and the respective radial lube passages will occur. If the locating extensions 84 and 86 are not properly seated against the locating wall 80, the left end 42 of the tube 34 will extend leftward from the shaft 10 and be visible to the assembly. If desired, adjusting structure such as a straight shank screwdriver slot or a hexagonal opening in the left end of tube 34 can be provided to assist the operator during assembly.

Figure 5:
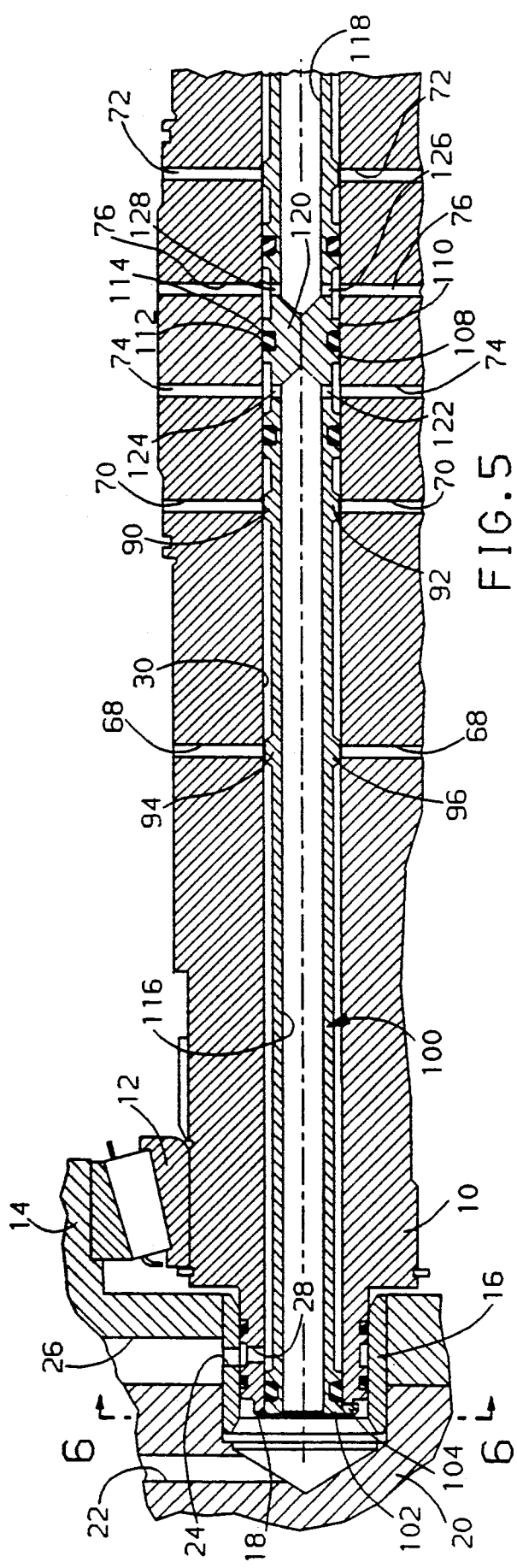
FIG. 5 is a view similar to FIG. 1 depicting another embodiment of the present invention.
Figure 6:
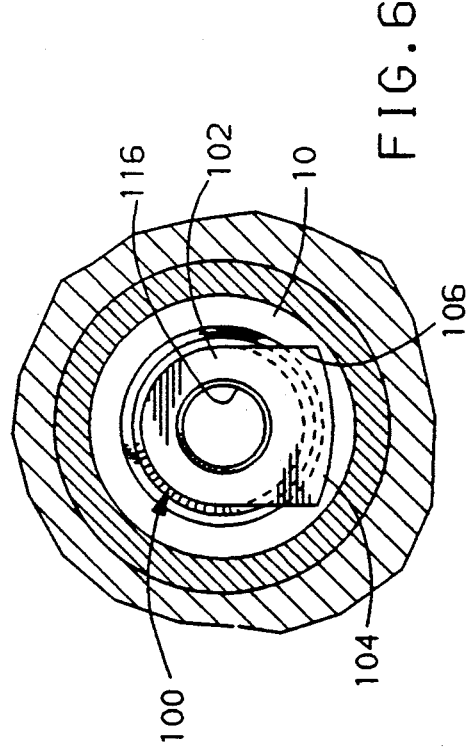
FIG. 6 is a view taken along line 6—6 in FIG. 5.

The embodiment shown in FIGS. 5 and 6 is quite similar to that described above for FIGS. 1 through 4. Accordingly, the components which are substantially identical will be given the same numerical designation. The major difference between the two embodiments is that a single transfer tube 100 is utilized in the embodiment shown in FIG. 5, thereby requiring a change in the locating mechanism utilized for establishing the correct positioning of the protuberances 90-96.

As seen in FIGS. 5 and 6, the left end 102 of the tube 100 has a radially extending locating or positioning tab or extension 104 which fits within a locating slot 106 formed in the left end of shaft 10. Since the tube is continuous from end to end, another pair of annular walls 108 and 110 are provided and are disposed between the radial feed passages 74 and 76.

The annular walls 108 and 110 form a seal groove 112 in which is disposed a conventional seal member 114 which will prevent the undesirable flow of fluid between the radial feed passages 74 and 76. The transfer tube 100 has a pair of central passages 116 and 118 which are open to fluid communication to the left and right ends, respectively, of the central bore 30. The passages 116 and 118 are separated by a central wall portion 120 to prevent the commingling of fluid therebetween.

A pair of radial passages 122 and 124 are formed in the tube 100 and at assembly, are maintained in radial alignment with the radial feed passages 74 such that fluid communication between the central passage 116 and radial feed passage 74 can be selectively maintained. Likewise, a pair of radial passages 126 and 128 are formed in the tube 100 and radially aligned with the radial feed passages 76 to permit selective fluid communication between the central passage 118 and radial feed passages 76.

The right end of transfer tube 100, which is not shown, is preferably similar in construction to the left end 40 of the transfer tube 34. Both of the above described embodiments will provide the desired flow restriction or orifice sizing required to establish the control of lubrication and/or cooling fluid which is to be distributed from a central or annular passage to a plurality of bushings, gears or clutch discs, which are components within a transmission mechanism. The above described invention is not limited by the types or the design of elements which are to be lubricated or cooled, since these particular elements do not have any influence on the basic concept of the present invention.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A fluid transfer structure in a transmission shaft comprising: a central bore formed in said shaft; locating means formed integral with one end of said central bore including a radially extending slot in said transmission shaft; a plurality of radial fluid passages for communicating fluid from said central bore intermediate the ends thereof; a fluid transfer tube having positioning means formed thereon including a tab member having a surface configuration complementary to said radially extending slot for cooperating with said locating means to orient the transfer tube in the central bore at a predetermined angular attitude, said transfer tube having a plurality of seal groove means formed on an outer surface at axially spaced locations for supporting seals, central feed passage means open at one end for communication with a fluid source, fluid flow restriction means formed on the outer surface of said transfer tube and being aligned with predetermined ones of said radial fluid passages when said transfer tube is oriented by said locating means and said positioning means for providing a flow restriction to fluid between said outer surface and the surface of said central bore at said radial fluid passages and for permitting unrestricted fluid flow bypassing said flow restriction means between said outer surface and said central bore at locations not open to said radial fluid passages; seal means disposed in said seal groove means for preventing direct intermingling of the fluid in said central feed passage means and the fluid between said transfer tube and said central bore; and fluid passage means formed in said transfer tube for directing fluid from said central passage means to at least one of said radial fluid passages at an axial location adjacent one of said seal groove means and said one of said radial fluid passages being maintained in fluid isolation from the fluid between the transfer tube and the central bore.

2. A fluid transfer structure in a transmission shaft comprising; a double ended central bore formed in said shaft; locating means formed integral with one end of said central bore including a radially extending slot in said transmission shaft; a plurality of radial fluid passages for communicating fluid from said central bore intermediate the ends thereof; a fluid transfer tube having positioning means formed thereon including a tab member having a surface configuration complementary to said radially extending slot for cooperating with said locating means to orient the transfer tube in the central bore at a predetermined angular attitude, said transfer tube having a plurality of seal groove means formed on an outer surface at axially spaced locations for supporting seals, central feed passage means open at one end for communication with a fluid source, a plurality of fluid flow restriction means formed on the outer surface of said transfer tube, each being comprised of a radial protuberance of predetermined circumferential extent and axial extent and also wherein the circumferential extent is less than the circumference of the central bore and being aligned with predetermined ones of said radial fluid passages when said transfer tube is oriented by said locating means and said positioning means for providing a flow restriction to fluid between said outer surface and the surface of said central bore at said radial fluid passages and for permitting unrestricted fluid flow bypassing said flow restriction means between said outer surface and said central bore at locations not open to said radial fluid passages; seal means disposed in said seal groove means for preventing direct intermingling of the fluid in said central feed passage means and the fluid between said transfer tube and said central bore; and fluid passage means formed in said transfer tube for directing fluid from said central passage means to at least one of said radial fluid passages at an axial location adjacent one of said seal groove means and said one of said radial fluid passages being maintained in fluid isolation from the fluid between the transfer tube and the central bore.

* * * * *